United States Patent [19]

Torihata et al.

[11] Patent Number: 4,794,634
[45] Date of Patent: Dec. 27, 1988

[54] POSITION-SENSITIVE PHOTODETECTOR AND LIGHT TRANSMISSIVE TABLET AND LIGHT-EMITTING PEN

[75] Inventors: Shigenori Torihata, Isehara; Hisaakira Imaizumi, Hiratsuka; Toru Suzuki; Tomoo Matsuda, both of Fujisawa; Masatake Hirooka, Isehara; Yokichi Nishi, Hiratsuka; Mitsuo Hosoi, Fujisawa; Naoya Tsurumaki, Hiratsuka; Yukitaka Takitani, Sagamihara, all of Japan

[73] Assignee: Kabushiki Kaisha Komatsu Seisakusho, Tokyo, Japan

[21] Appl. No.: 896,009

[22] Filed: Aug. 13, 1986

[30] Foreign Application Priority Data

Dec. 24, 1985 [JP] Japan .................................. 60-198749
Feb. 14, 1986 [JP] Japan .................................. 61-30238

[51] Int. Cl.$^4$ .................... H04M 11/00; G06F 3/033; G08C 21/00
[52] U.S. Cl. .................................. 379/96; 340/707; 178/18
[58] Field of Search ........................ 379/93, 96, 100; 340/707, 712; 178/18, 87; 350/342

[56] References Cited

U.S. PATENT DOCUMENTS

| 4,177,354 | 12/1979 | Matthews ............................... 178/18 |
| 4,345,248 | 8/1982 | Togashi et al. .................. 340/707 X |
| 4,653,086 | 3/1987 | Laube ..................................... 379/96 |
| 4,655,552 | 4/1987 | Togashi et al. ...................... 350/342 |
| 4,659,876 | 4/1987 | Sullivan et al. ....................... 379/96 |
| 4,679,909 | 7/1987 | Hamada et al. .................. 340/707 X |
| 4,723,836 | 2/1988 | Kono et al. ...................... 340/707 X |

FOREIGN PATENT DOCUMENTS

| 58-86674 | 5/1983 | Japan ................................. 340/707 |
| 61-8342 | 1/1986 | Japan . |
| 61-28198 | 2/1986 | Japan . |

Primary Examiner—Keith E. George
Attorney, Agent, or Firm—Diller, Ramik & Wight

[57] ABSTRACT

The data input device comprises a tablet portion made of a two-dimensional position-sensitive photodetector and a planar display element laid one on the other, and a light emitting pen forming a light spot on a light-receiving surface of the position-sensitive photodetector. The locus of the movement of the light emitting pen is displayed on the surface of the planar display element at correspond positions in accordance with the output of the two-dimensional position-sensitive photodetector, and the contents of the display provided on the planar displaying element are allowed to be delivered for subsequent processings.

15 Claims, 9 Drawing Sheets

4,794,634

POSITION-SENSITIVE PHOTODETECTOR AND LIGHT TRANSMISSIVE TABLET AND LIGHT-EMITTING PEN

BACKGROUND OF THE INVENTION

1. Field of the Invention

This invention relates to a data input device which is adapted to input data such as a pattern, character and the like into a computer and the like.

2. Description of the Prior Art

A tablet type input device has been widely used for inputting data such as a pattern, character and the like into a computer and the like.

However, since this type of input device possesses no image-displaying function of the input data, it has been required to provide separately a display device such as CRT and LCD when the display is required, thus rendering a portable use thereof utterly inpracticable.

When the displaying device is provided separately, the input data is displayed on the display device provided at a different position from that of the inputting surface, and hence it is impossible to input the data such as the pattern and the like on the inputting surface with a sensation similar to that of the case of writing the data on a sheet of paper.

SUMMARY OF THE INVENTION

A primary object of the present invention is to provide a data input device wherein data such as a pattern, character and the like can be inputted with a similar sensation as in the case of writing the pattern, character and the like on a sheet of paper.

The aforementioned and other objects of the present invention can be achieved by a data input device according to the present invention which comprises a tablet portion made of a two-dimensional position-sensitive photodetector and a planar display element laid one on the other, a light emitting pen forming a light spot on a light-receiving surface of the light-position detector, display controlling means which controls the planar display element such that locus of the movement of the light emitting pen is displayed on the planar display element at corresponding positions in accordance with the output of the position-sensitive photodetector, and means for outputting the contents of the display on the planar display element for subsequent processings. With the aforementioned construction of the data input device of this invention, the locus of the movement of the light emitting pen indicating the input data can be displayed on the display element in real time, and furthermore, the input data can be delivered to a desired apparatus provided outside of the data input device separately.

DETAILED DESCRIPTION OF PREFERRED EMBODIMENTS

Figure 1:
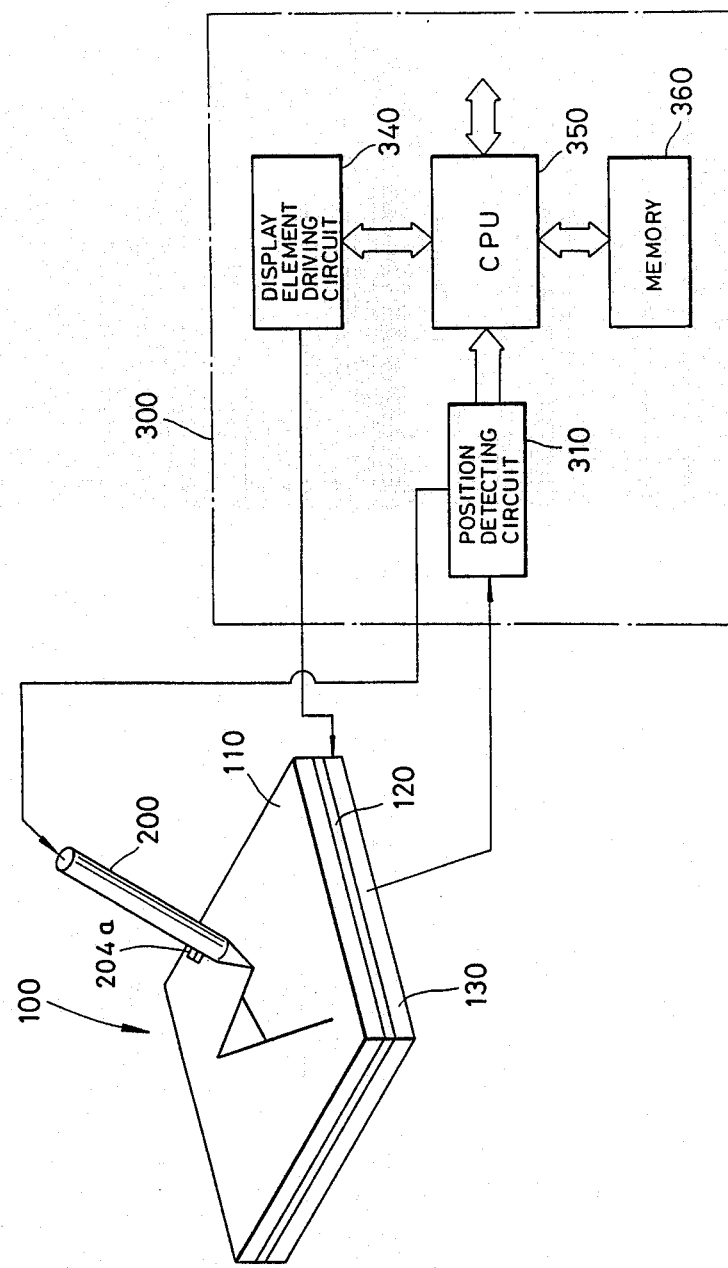
FIG. 1 is a diagram showing a data input device according to a preferred embodiment of the present invention.

As shown in FIG. 1, a data input device of this invention comprises a tablet portion 100, a light emitting pen 200, and a signal processing portion 300.

Figure 2:
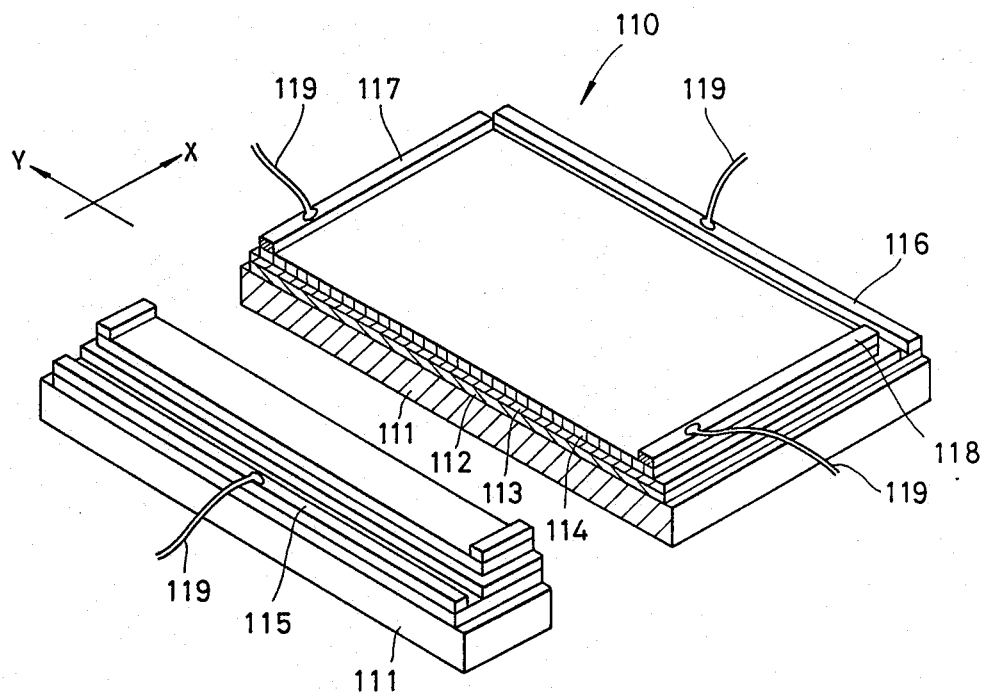
FIG. 2 is a perspective view showing a position-sensitive photodetector used in the embodiment.

The tablet portion 100 is constructed such that an optical filter 120 is provided on a two-dimensional position sensitive photodetector 110, and a planar display element 130 is further provided on the optical filter 120. In this embodiment of the invention, the position sensitive photodetector 110 is constructed as shown in FIG. 2. More specifically, a resistance layer 112 made of an electrically conductive film is firstly deposited on a substrate 111 made of glass or the like by way of sputtering, vapor deposition and the like, and an amorphous semiconductor layer 113 is formed on the upper surface of the resistance layer 112. Furthermore, another resistance layer 114 made of a transparent electrically conductive material is formed on the upper surface of the amorphous semiconductor laye 113 in a similar manner as in the case of the resistance layer 112, thereby providing the semiconductor light-position detector 110.

In this case, the resistance layers 112 and 114 are formed into a thickness approximately equal to 1000 Å by use of, for instance, ITO.

Figure 3:
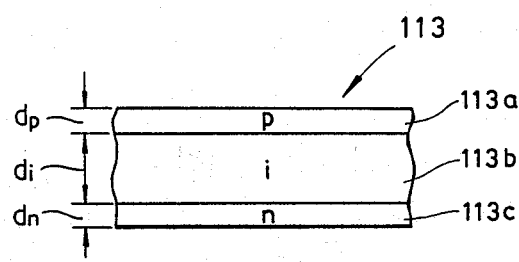
FIG. 3 is a diagram showing one part of a semiconductor layer of the detector on a much enlarged scale.

The amorphous semiconductor layer 113 is made into a three layer construction comprising a p type amorphous silicon layer (hereinafter termed p layer) 13a, i type amorphous silicon layer (hereinafter termed i layer) 113b, and an n type amorphous silicon layer (hereinafter termed n layer) 113c as shown in FIG. 3.

The p, i and n type layers forming the semiconductor amorphous layer 113 are formed by a glow-discharge CVD (chemical vapor deposition) method and the like. In the shown embodiment, the thicknesses dp, di and dn of these layers are selected in the ranges of $dp \approx 100\text{–}300$ Å, $di \approx 4000\text{–}6000$ Å, and $dn \approx 300\text{–}500$ Å.

At both end-edges of the resistance layer 112 are provided a pair of X-direction collector electrodes 115 and 116 of a rod shape disposed opposingly. Likewise, at both end-edges of the resistance layer 114 are provided a pair of Y-direction collector electrodes 117 and 118 also of a rod shape in a mutually opposing manner.

A lead wire 119 is connected to a central portion of each of the X and Y direction electrodes 115–118. The electrodes 115–118 may be made of aluminum or aluminum alloy.

The position-sensitive detector 110 operates as follows.

Figure 4:
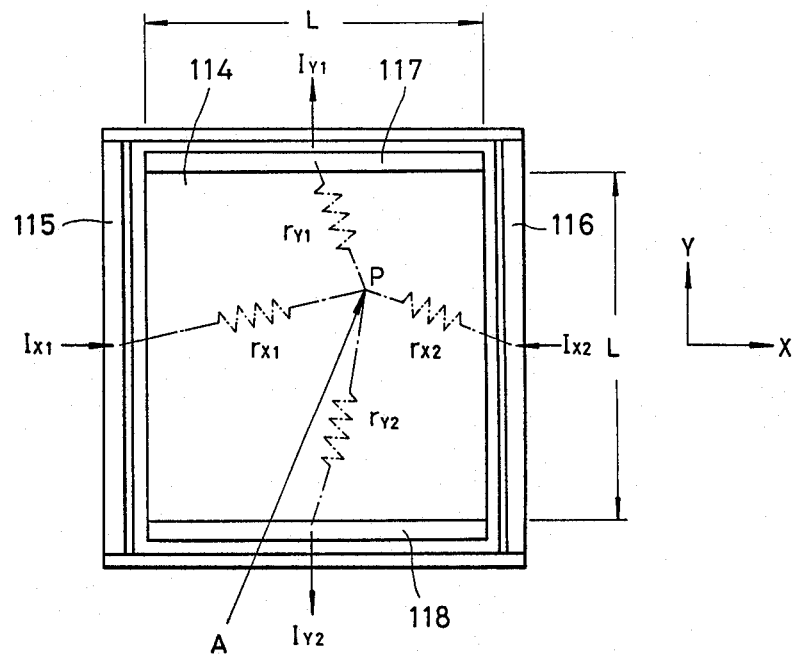
FIGS. 4(a), 4(b) and 4(c) are diagrams showing the operation of the position-sensitive photodetector.
Figure 4:
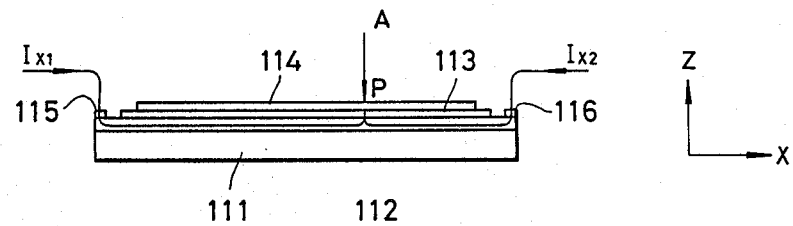
Figure 4:
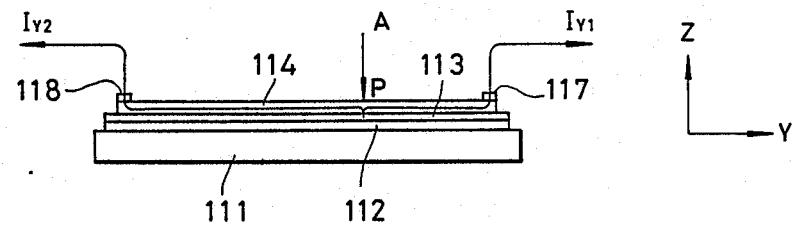

When a light beam A is projected on the detector 110 as shown in FIGS. 4(a), 4(b) and 4(c), the light beam A passing through the transparent resistance layer 114 reaches the semiconductor layer 113, thus generating an electric charge at the incident point P due to the photoelectric effect of the layer 113. In the resistance layer 112, the displacement of electric charge presents electric currents $I_{X1}$ and $I_{X2}$ flowing to the electrodes 115 and 116 at magnitudes defined by the resistances $r_{X1}$ and $r_{X2}$ provided between the point P and the electrodes 115 and 116, while in the resistance layer 114, the displacement of electric charge presents electric currents $I_{Y1}$ and $Y_{Y2}$ flowing to the electrodes 117 and 118 at magnitudes defined by the resistances $r_{Y1}$ and $r_{Y2}$ between the point P and the electrodes 117 and 118. The currents $I_{X1}$, $I_{X2}$ and $I_{Y1}$, $I_{Y2}$ are picked up from the X-direction electrodes 115, 116 and the Y-direction electrodes 117, 118, respectively. In FIG. 4(a), numeral L designates a full scale (of, for instance, 8 cm) of the detecting region of the poiition-sensitive photodetector 110.

The position-sensitive photodetector 110, in which the semiconductor layer 103 is made of amorphous silicon, can be made into a larger surface area (of, for instance 100 mm×100 mm) in comparison with the position-sensitive photodetector utilizing monocrystalline silicon, and hence is advantageous when it is used for the tablet portion 100 of the data input device. However, a position-sensitive photodetector utilizing the monocrystallinessilicon may also be used in the data input device of this invention in a case where the surface area required for the tablet portion is not large.

The aforementioned optical filter 120 is provided for eliminating outside disturbing light, and therefore an acrylic resin plate or glass plate of red color may be used for this filter.

The planar display element 130 of this embodiment is preferably of a matrix liquid crystal type. Since this type of display element is transparent, the light emitted from the light emitting pen 200 shown in FIG. 1 can reach the semiconductor light-position detector 110 through the display element 130. However, the planar display element 130 is not necessarily of the matrix liquid crystal type, but may be various types such ss matrix electroluminescent display (ELP), matrix plasma display (PDP), matrix hot-cathod ray display (VED), electrochromatic display (ECD) and the like.

Figure 5:
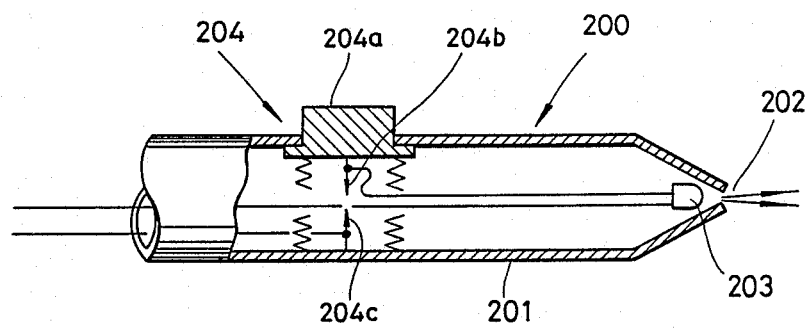
FIG. 5 is a partly fragmented sectional view showing a light emitting pen used in the embodiment on an enlarged scale.

The light mmitting pen 200 used in this invention is constructed as shown in FIG. 5 housed in a casing 201 having an opening 202 at one end thereof, and a light-emitting element (LED) 203 provided in the proximity of the opening 202. A push buttom switch 204 is further provided in combination with a push button 204a projecting through the casing 201 outwardly. When the push button 204a is depressed, contacts 204b and 204c are brought into contact with each other. Thereby energizing the light-emitting element 203.

The signal processing portion 300 comprises a position detecting circuit 310, a CPU 350, a display-element driving circuit 340, and a memory 360 as illustrated in FIG. 1.

Figure 6:
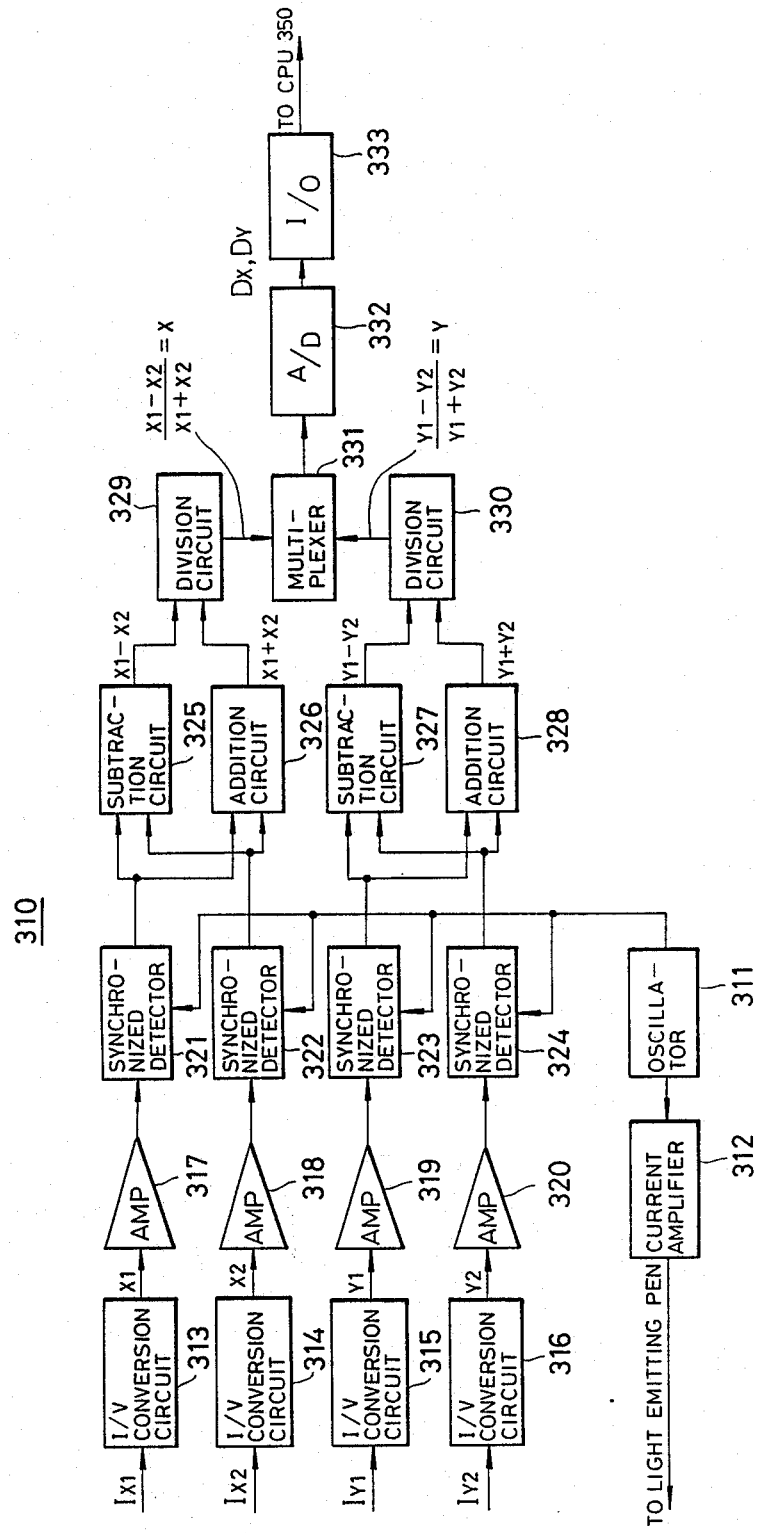
FIG. 6 is a block diagram showing a light-position detecting circuit.

The operation of the above described emboiiment of this invention will now be described with reference to FIG. 6 showing a construction of the position detecting circuit 310.

The position detecting circuit 310 comprises an oscillator 311, the output of which is amplified by a current amplifier 312, and applied to the light-emitting element 203 of the light emitting pen 200 through the push-button switch 204. Thus, when the push-button switch 204 is depressed in a state where an end of the light emitting pen 200 is brought to a position on the upper surface of the planar display element 130 as shown in FIG. 1, a spot-light emitted from the light-emitting element 203 is passed through the planar display element 130 and the filter 120, and projected on the light-receiving surface of the position-sensitiv photodetector 110.

As a consequonce, tho divided currents $I_{X1}$, $I_{X2}$ and $I_{Y1}$, $I_{Y2}$ corresponding to the incident position of the spot light are delivered from the position-sensitive photodetector 110, and these currents are converted by current-voltage conversion circuits 313, 314, 315 and 316 into corresponding voltage signals X1, X2 and Y1, Y2. The voltage signals are these amplified by amplifiers 317, 318, 319 and 320 and applied to synchronized detectors 321, 322, 323 and 324, respectively.

The synchronized detectors 321–324 also receive the output of the oscillator 311 as a synchronizing signal and act to deliver those signals synchronized with the synchronizing signal exclusively. The voltage signals X1, X2 and Y1, Y2 based on the light emitted from the light-emitting element 203, are synchronized with the output of the oscillator 301, and hence the signals X1, X2 and Y1, Y2 are allowed to be detected by the synchronized detectors 321–324, and outputs corresponding thereto are delivered from the synchronized detectors 321–324. Although the optical filter 120 has been provided for attenuating outside disturbance light of, for instance, a fluorescent lamp, some part of the disturbance light may reach the position-sensitive photodetector 110. The synchronized detectors 321–324 operate to eliminate the adverse effects of the disturbance light satisfactorily.

The output signal X1 deiivered from the synchronized detector 321 is applied to a minuend input terminal of a subtraction circuit 325, and also to an input terminal of an addition circuit 326, while the output signal X2 delivered from the synchronized detector 322 is applied to a subtrahend input eerminal of the subtraction circuit 325 and also to another input terminal of the addition circuit 326. Likewise, the output signal Y1 delivered from the synchronizdd detector 323 is applied to a minuend input terminal of a subtraction circuit 327 and also to an input terminal of an addition circuit 328, while the output signal Y2 delivered from the synchronized detector 324 is applied to a subtrahend input terminal of the subtraction circuit 327 and also to another input terminal of the addition circuit 328.

As a result, signals X1−X2 and X1+X2 are delivered from the subtraction circuit 325 and the addition circuit 326, respectively, and these signals are applied to a division circuit 329. Likewise, signals Y1−Y2 and Y1+Y2 are delivered from the subtraction circuit 327 and the addition circuit 328, respectively, and these signals are applied to a division circuit 330.

The division circuits 329 and 330 thereby deliver analog signals.

$$X = \frac{X1 - X2}{X1 + X2} \text{ and } Y = \frac{Y1 - Y2}{Y1 + Y2}$$

which represent coordinate values of the light projected position in the position-sensitive photodetector 110. The analog signals X and Y are applied to a multiplexer 331 which alternately delivers either one of the signals to an analog-digital converter 332. The output digital signals $D_X$ and $D_Y$ delivered from the analog-digital converter 332 are sent through are interface circuit 333 to the CPU 350 to be used for designating the position of the projected light spot. These signals $D_X$ and $D_Y$ outputted from the position detecting circuit 310 are not influenced by the intensity variation of the light emitted from the light emitting pen 200.

In the memory 360 shown in FIG. 1, addresses are assigned corresponding to all the image elements provided on the surface of the planar display element 130. CPU 350 designates an address bared on the digital signals $D_X$ and $D_Y$ and writes a signal "1" into the designated address. As a consequence, image data shwwing the locus of the movement of the light emitting pen 200 on the surface of the display element 130 are stored in the memory 360.

The image data thus stored in the memory 360 is inputted in the display element driving circuit 340 in real time under the control of the CPU 350, and hence the display element 130 displays the locus of the light emitting pen 200 in real time. On the other hand, the image data stored in the memory 360 is delivered under the control of the CPU 350 to other apparatus such as a computer and a word processor.

Conversely when image data concerning to a pattern or character is inputted from a computer and the like into the CPU 350, the data is stored in the memory 360 and simultaneously displayed on the display element 130.

According to the preferred embodiment of the invention, when a character or pattern is drawn on the planar display element 130 by use of the light emitting pen 200, the image data is inputted as described above, and the character or pattern is displayed on the display element 130 in the same manner as in the csse of writing the character and the like by use of a pencil or a pen.

Figure 7:
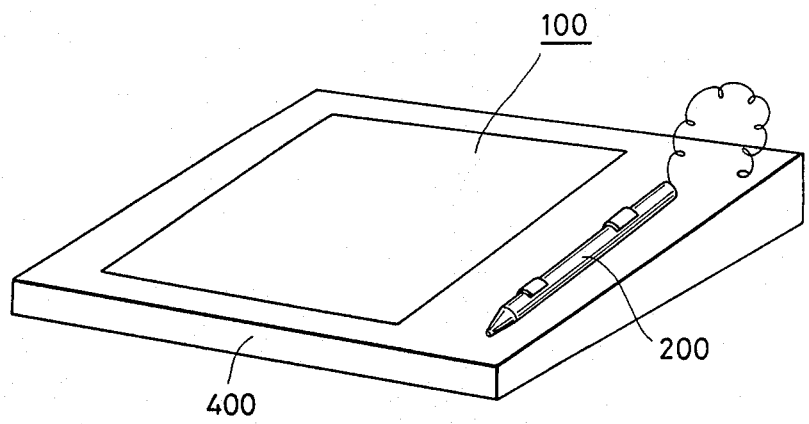
FIG. 7 is a perspective view showing an example wherein the device according to this invention is provided in a casing.

FIG. 7 illustrates an example wherein the input device of this invention is provided in a casing 400 of a compact size.

In a case where the character or pattern displayed on the display element 130 is desired to be erased, a clear switch not shown, which is provided at a suitable position on the light emitting pen 200 or on the casing 400 is operated.

Furthermore, although in the above described embodiment, the light-emitting element 203 has been ignited by operating the push-button switch 204 provided on the light emitting pen 200, the light-emitting element 203 may otherwise be ignited by operating a pressure-sensitive switch provided in the end portion of the light emitting pen 200 in response to the writing pressure, and in this manner, the light-emitting element 203 can be ignited automatically only at the time of the writing operation of the light emitting pen 200.

Although in the above described embodiment, the planar display element 130 has been provided on the upper side of the position-sensitive photodetector 110, it is apparent that the planar display element 130 may otherwise be placed on the lower side of the detector 110. In this case, the substrate 111 of the detector 110 is made of a transparent material such as glass, and a transparent electrically conductive layer must be formed on both of the resistance layers 112 and 114 so as to provide a transparent position-sensitive photodetector 110.

Although in the position-sensitive photodetector 110 used in the embodiment of the present invention, X-direction collecting electrodes 115, 116 have been provided On the resistance layer 112 and Y-direction collecting electrodes 117, 118 have been provided on the resistance layer 114 as shown in FIG. 2, it may otherwise be so constructed that a common electrode is provided on one resistance layer, while X-direction and Y-direction collecting electrodes are provided on the other resistance layer.

Although, in the embodiment, the position-sensitive photodetector 110 has been constructed such that the resistance layer 114 is formed on the light-receiving surface, the detector 110 may otherwise be constructed such that the substrate 111 is provided on the light-receiving side. In this case, the substrate 111 and the resistance layer 112 must be constructed to be transparent, and when it is desired, the substrate 111 may be constructed to be operable as an optical filter.

The data input device according to this invention may be used in various manner. For instance, it may be so arranged that the data delivered from a computer is received in the CPU 350 of this device to be displayed on the display element 130, and an answer to that data is written by use of the light emitting pen 200 to be transmitted back to the computer. In this manner, a conversation between the user of this device and the computer may be carried out.

Since the input device of this invention is made into a portable size, it may be used with a public telephone system for transmitting and receiving image data such as a pattern, characters and the like between remote positions. In this case, inputting and outputting of the data may be realized by use of sound couplers.

Figure 8:
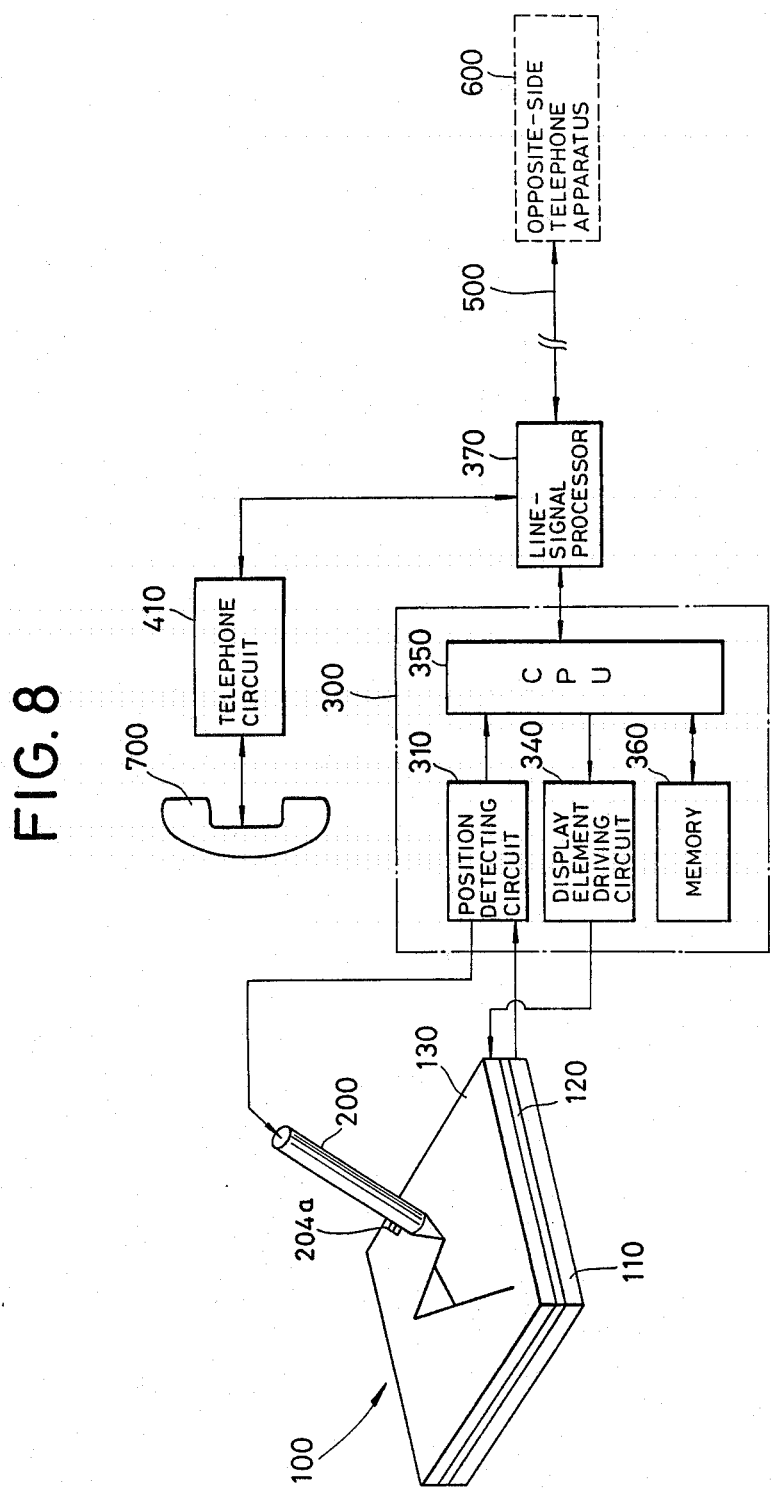
FIG. 8 is a block diagram showing an embodiment wherein the device of this invention is applied to a telephone apparatus.

FIG. 8 illustrates an arrangement of a telephone apparatus utilizing the data input device of this invention. In this apparatus, the image data delivered from the CPU 350 is applied to a line-signal processor 370. In the signal processor 370, the output signal from the CPU 350 is subjected to a modulation process and the like for converting the output signal into a non-audible signal which can be clearly discriminated from a voice signal. The non-audible signal thus converted is synthesized with a voice signal obtained from a conventional telephone circuit 410, and a resultant signal thus obtained is outputted over a telephone line 500.

The line-signal processor 370 further operates to select image data out of an input signal, which is transmitted from an opposite-side apparatus 600 having a similar construction as that of the shown side apparatus, by subjecting the input signal to a demodulation process and the like, and to apply the image data to the CPU 350. The signal processor 370 further selects a voice signal out of the input signal, and applies the same to a hand set 700 through the telephone circuit 410.

When the image data sent from the opposite-side telephone apparatus 600 is applied through the signal processor 370 to the CPU 350, the image data is firstly memorized, under the control of the CPU 350, into the memory 360, and at the same time the image data is applied to the display element driving circuit 340. As a consequence, the planar display element 130 displays an image based on the image data sent from the opposite-side telephone apparatus 600.

According to the embodiment shown in FIG. 8, beside of an ordinary voice communication carried out between both side telephone apparatus by use of the hand-set 700, an image data written in the tablet portion 100 can be transmitted over the telephone line 500 to the opposite-side telephone apparatus 600, so that the image data can be displayed on the tablet portion of the opposite-side telephone apparatus 600. Furthermore, an image data transmitted from the opposite-side telephone apparatus 600 can be displayed on the display element 130 in the tablet portion of the own apparatus.

According to this embodiment, since image data of, for instance, a pattern or character can be transmitted and received other than the ordinary telephone operation, and displayed on a displaying surface in the tablet portion 100, it is made possible, for instance, to indicate a route or a configuration of an article quickly and accurately, and furthermore a conversation via writing can be thereby performed between deat or dumb persons.

Figure 9:
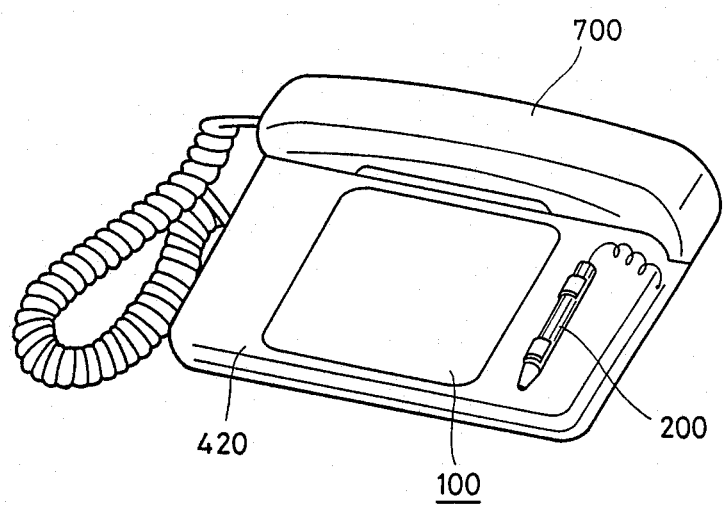
FIG. 9 is a perspective view showing a telephone apparatus thus obtained.

In this embodiment, the tablet portion 100 and the light emitting pen 200 are preferably mounted on a telephone casing 420 as shown in FIG. 9. However, it is of course possible to provide the tablet portion 100 and the light emitting pen 200 in a separate casing 400 as shown in FIG. 7. In this case, the separate casing 400 and the telephone apparatus must be connected together through a cable.

Figure 10:
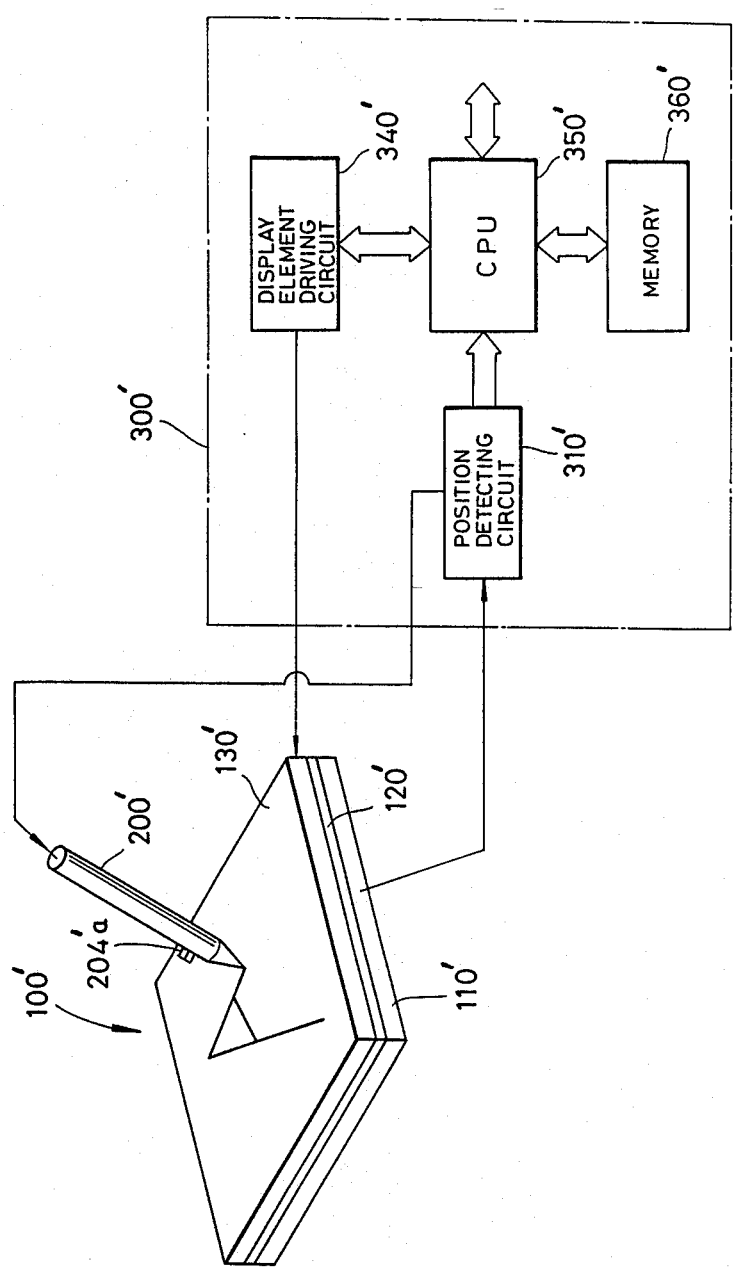
FIG. 10 is a diagram showing a data input device according to another embodiment of the present invention.

In FIG. 10 there is illustrated another data input device, and components thereof identical to those of the data input device of FIG. 1 have been identically numbered though primed. However, in lieu of the two-dimensional position sensitive photodetector 110 of the tablet portion 100 of FIG. 1, the tablet portion 100' illustrates the two-dimensional position sensitive photodetector 110' overlying the optical filter 120' and the planar display element 130' underlying the optical filter 140'. Otherwise, the structure, function, and operation of the embodiment of FIG. 10 is identical to that of the embodiment of FIG. 1.

The telephone apparatus combined with the data input device as described above does not require a recording paper and a feeding mechanism of the recording paper as in a case of the facsimile containing telephone apparatus, and hence can be constructed in a small size at a low cost, and the operation thereof is extremely simplified. Furthermore, the telephone apparatus may be used not only in connection with an ordinary telephone system, but also with an extension system provided in a company or the like.

What is claimed is:

1. A tablet type data input/output device comprising:
   a tablet portion comprising a rectangular position-sensitive photodetector and a light transmissive planar display element disposed on said photodetector, said photodetector comprising a substrate, a first resistance layer disposed on said substrate, an amorphous semiconductor layer disposed on said first resistance layer, and a second resistance layer disposed on said amorphous semiconductor layer, said first resistance layer being provided at opposing edges thereof in a predetermined first direction with a pair of first electrodes each for taking out an output signal, said second resistance layer being provided at opposing edges thereof in a second direction perpendicular to said first direction with a pair of second electrodes each for taking out an output signal;
   a light emitting pen for irradiating a light spot onto said tablet portion so as to indicate a data input position;
   detecting means for detecting the data input position indicated by said light emitting pen based on the output signals taken out from said first and second electrodes;
   display control means for controlling display of said planar display element; and
   data transmitting means for transmitting output of said detecting means for subsequent processings.

2. The tablet type data input/output device according to claim 1, wherein said planar display element is of a liquid crystal type.

3. The tablet type data input/output device according to claim 1, wherein said amorphous semiconductor layer comprises a n type amorphous silicon layer, an i type amorphous silicon layer disposed on said n type amorphous silicon layer, and a p type amorphous silicon layer disposed on said i type amorphous silicon layer.

4. The tablet type data input/output device according to claim 1, wherein said detecting means obtains first position data corresponding to said data input position in said first direction by dividing the difference between the output signals from said first electrodes by addition of the output signals from said first electrodes, and second position data corresponding to said data input position in said second direction by dividing the difference between the output signals from said second electrodes by addition of the output signals from said second electrodes.

5. The tablet type data input/output device according to claim 4, wherein said data transmitting means transmits said first and second position data in time sharing manner.

6. The tablet type data input/output device according to claim 1, wherein said tablet portion further comprises an optical filter layer interposed between said position-sensitive photodetector and said planar display element.

7. The tablet type data input/output device according to claim 1, wherein said display control means comprises memory means for storing output of said detecting means, and said planar display element displays locus of said data input position indicated by said light emitting pen in accordance with output of said memory means.

8. The tablet type data input/output device according to claim 1, wherein said tablet portion is mounted to a telephone set, said display control means causes said planar display element to display data transmitted from another telephone set through a telephone line, and said data transmitting means transmits output of said detecting means to said another telephone set through said telephone line.

9. A tablet type data input/output device comprising:
   a tablet portion comprising a planar display element and a light transmissive rectangular position-sensitive photodetector disposed on said planar display element, said photodetector comprising a substrate, a first resistance layer disposed on said substrate, an amorphous semiconductor layer disposed on said first resistance layer, and a second resistance layer disposed on said amorphous semiconductor layer, said first resistance layer being provided at opposing edges thereof in a predetermined first direction with a pair of first electrodes each for taking out an output signal, said second resistance layer being provided at opposing edges thereof in a second direction perpendicular to said first direction with a pair of second electrodes each for taking out an output signal;
   a light emitting pen for irradiating a light spot onto said tablet portion so as to indicate a data input position;
   detecting means for detecting the data input position indicated by said light emitting pen based on the output signals taken out from said first and second electrodes;

display control means for controlling display of said planar display element; and data transmitting means for transmitting output of said detecting means for subsequent processings.

10. The tablet type data input/output device according to claim 9, wherein said planar display element is of a liquid crystal type.

11. The tablet type date input/output device according to claim 9, wherein said amorphous semiconductor layer comprises a n type amorphous silicon layer, an i type amorphous silicon layer disposed on said n type amorphous silicon layer, and a p type amorphous silicon layer disposed on said i type amorphous silicon layer.

12. The tablet type data input/output device according to claim 9, wherein said detecting means obtains first position data corresponding to said data input position in said first direction by dividing the difference between the output signals from said first electrodes by addition of the output signals from said first electrodes, and second position data corresponding to said data input position in said second direction by dividing the difference between the output signals from said second electrodes by addition of the output signals from said second electrodes.

13. The tablet type data input/output device according to claim 12, wherein said data transmitting means transmits said first and second position data in a time sharing manner.

14. The tablet type data input-output device according to claim 9, wherein said display control means comprises memory means for storing output of said detecting means, and said planar display element displays locus of said data input position indicated by said light emitting pen in accordance with output of said memory means.

15. The tablet type data input/output device according to claim 9, wherein said tablet portion is mounted to a telephone set, said display control means causes said planar display element to display control means causes said planar display element to display data transmitted from another telephone set through a telephone line, and said data transmitting means transmits output of said detecting means to said another telephone set through said telephone line.

* * * * *